UNITED STATES PATENT OFFICE.

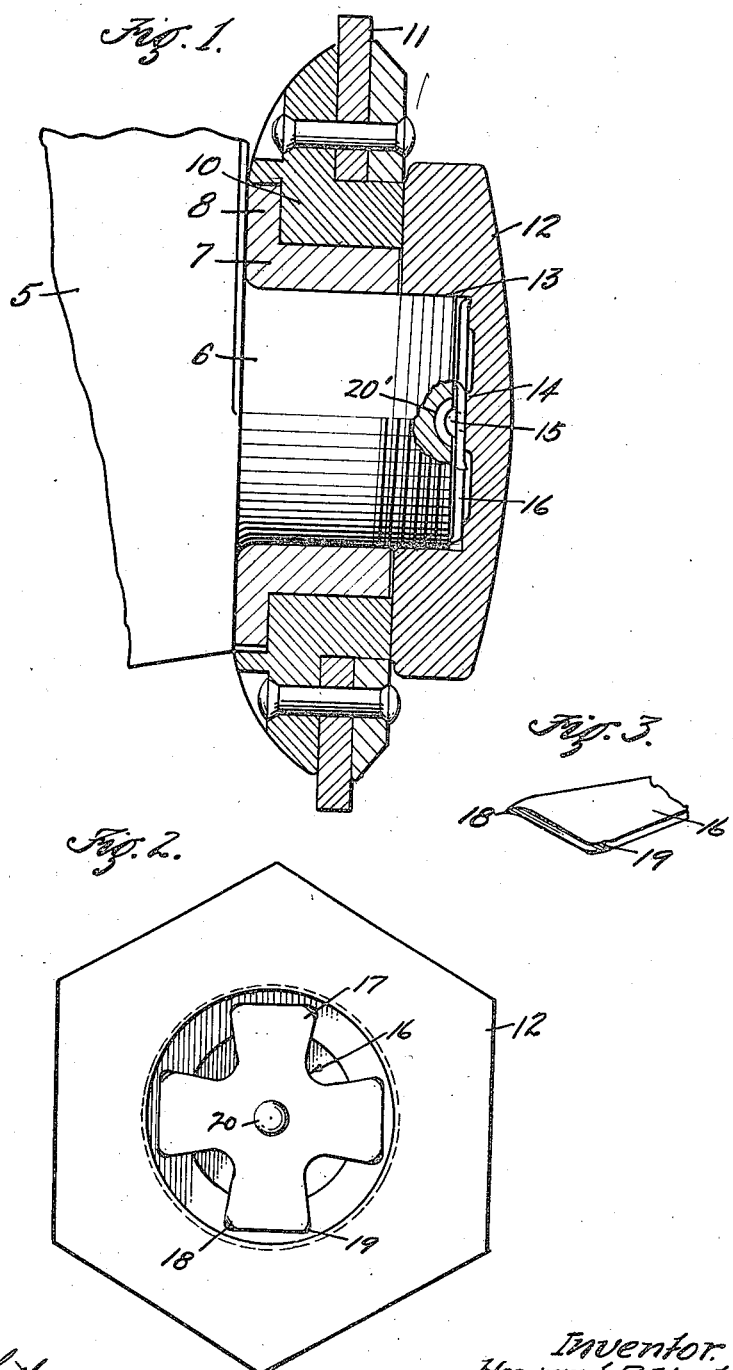

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

NUT-LOCK.

1,194,293.

Specification of Letters Patent.

Patented Aug. 8, 1916.

Application filed July 25, 1914. Serial No. 853,196.

*To all whom it may concern:*

Be it known that I, HOWARD R. HUGHES, a citizen of the United States, residing at Houston, in the county of Harris, State of Texas, have invented new and useful Improvements in Nut-Locks, of which the following is a specification.

This invention relates to a mounting for rotary cutting disks, and particularly pertains to a device for locking the cutting disk against accidental displacement on its mounting.

It is the object of this invention to provide a mounting for rotary cutting disks such as are employed on rotary cutting disk drills used in well drilling operations which mounting is so constructed as to permit the removal and replacement of the cutting disk without detaching the drill head from its mounting and which will effectively prevent the rotary cutting disk from being displaced on its mounting during the operation of the drill.

A further object is to provide a cap for retaining cutting disks in position on their arbors embodying means by which the cap is effectively locked against reverse movement on its threaded mounting so that it will not be worked loose by impact with the materials severed by the cutting disk.

The invention is illustrated in the accompanying drawings, in which:

Figure 1 is a view in vertical section of the cutting disk and its mounting showing the arbor in elevation with parts broken away, and illustrating the construction of the locking cap. Fig. 2 is a view in elevation of the inner face of the locking cap and showing the locking device thereon. Fig. 3 is a detail of the locking member.

More specifically, 5 indicates the tool shank or head which is formed with a laterally extending arbor 6 for carrying the rotary cutting disk. Mounted on the arbor 6 is a sleeve or bushing 7 having an annular flange 8 on its inner end adapted to abut against the shank 5 and serve as an end thrust bearing for a hub 10 on which an annular cutting blade 11 is mounted; the hub 10 and blade 11 constituting the cutting disk.

The outer end of the arbor 6 is externally threaded and is designed to receive a cap nut 12 formed with an internally threaded depression 13 adapted to engage the threaded end of the arbor 6. Formed in the bottom of the depression 13 is a boss 14 to which is secured a stud 15 projecting centrally of the depression 13 and on which a plate 16 is revolubly mounted.

The plate 16 is formed with a series of radiating arms 17 here shown as four in number and arranged in the form of a Maltese cross. The outer ends of the arms 17 terminate adjacent the annular side wall of the depression 13 with one of the corners formed at the intersection of the end of each arm and one side thereof bent outwardly to form a prong 18; the point of which projects from the side of the arm 17 opposite the side facing the direction of rotation of the cap nut 12 when the latter is being screwed on the arbor 6. In like manner the opposite corner of each arm 17 is bent inwardly toward the bottom of the depression 13 to form a prong 19 adapted to engage the bottom of the depression 13 when the cap nut is screwed in place. The plate 16 is held in place in the depression 13 by means of a head 20 formed on the stud 15.

In the application of the invention, the bushing 7 is placed on the arbor 6 with the cutting disk composed of the hub 10 and blade 11 revolubly mounted thereon. The cap nut 12 is then screwed on the arbor 6 until it bears tightly against the outer end of the bushing 7, which projects a slight distance beyond the outer face of the hub 10 so that the latter will have a sliding contact between its outer face and the inner face of the cap nut 12, which projects alongside of the end of the hub 10, as shown in Fig. 1, and serves to retain the latter in place on the bushing 7.

The depression 13 is of such depth that when the cap nut 12 is screwed to abut against the bushing 7 the plate 16 will be securely clamped between the bottom of the depression 13 and the outer end of the arbor 6; the latter being formed with a recess 20' on its outer end into which the head 19 on the stud 15 projects. When the plate 16 is thus clamped between the cap 12 and the outer end of the arbor 6 the prongs 18 will be forced into engagement with the end of the arbor 6 and the prongs 19 will be engaged with the bottom wall of the recess 13 in such manner as to oppose rotation of the cap nut 12 in the direction required to unscrew it from its threaded connection with the arbor 6, thus effectively locking the cap nut against accidental removal from the arbor 6 or working loose thereon. The prongs 18 and 19 are hardened so as to readily bite into the softer metal of which the cap nut 12 and the arbor 6 are formed.

When it is desired to remove the cap nut 12 the latter is rotated under sufficient force to cause the prongs 18 to cut a channel in the end of the arbor 6 as they are rotated which, when the channel is cut to be continuous, will permit of the ready removal of the cap nut. On replacing the cap nut after such channel is formed the prongs 18 and 19 will be bent slightly to increase their length so that they will reëngage the bottom of the channel to effectively lock the nut when it is again screwed in place.

What I claim is:

1. The combination with an arbor, of a cap nut formed with a depression having threaded walls adapted to be screwed on the arbor, a plate formed with laterally extending prongs adapted to be interposed between the end of the arbor and the closed end of the nut to effect a locking engagement between the arbor and the cap nut, whereby the latter is locked against reverse rotation.

2. In combination with an arbor having a threaded outer end portion, a cap nut formed with an internally threaded depression to receive the threaded end of the arbor, a plate pivotally mounted in the bottom of the depression in the cap nut, arms formed on said plate, and laterally extending prongs on said arms adapted to engage the end of the arbor and the bottom wall of the depression in the cap nut to lock the cap nut against reverse rotation when screwed in position on the arbor.

3. The combination with an arbor of a cap nut threaded on the arbor, and a plate formed with radiating arms having laterally extending prongs on their outer ends adapted to bear against the end of the arbor and be engaged by the cap nut by which the latter is locked in place.

4. The combination with an arbor threaded on its outer end, of a cap nut screwed on the threaded end of the arbor, and means provided with laterally extending teeth disposed between the cap nut and the end of the arbor to hold the cap nut against reverse rotation.

In witness that I claim the foregoing I have hereunto subscribed my name this 3rd day of July, 1914.

HOWARD R. HUGHES.

Witnesses:
 MARGUERITE BATES,
 MARIE BATTEY.